(12) United States Patent
Lee et al.

(10) Patent No.: US 7,197,441 B2
(45) Date of Patent: Mar. 27, 2007

(54) METHOD FOR GENERATING PROGRESSIVE SOLID MODELS BASED ON CELLULAR TOPOLOGY

(75) Inventors: Jae Yeol Lee, Taejon (KR); Hyun Kim, Seoul (KR)

(73) Assignee: Electronics and Telecommunications Research Institute, Taejon (KR)

( * ) Notice: Subject to any disclaimer, the term of this patent is extended or adjusted under 35 U.S.C. 154(b) by 780 days.

(21) Appl. No.: 10/335,855

(22) Filed: Jan. 3, 2003

(65) Prior Publication Data
US 2004/0059550 A1  Mar. 25, 2004

(30) Foreign Application Priority Data
Sep. 19, 2002  (KR) .................. 10-2002-0057251

(51) Int. Cl.
*G06F 17/10* (2006.01)
(52) U.S. Cl. .................... 703/2; 345/419; 345/420; 345/622; 703/10
(58) Field of Classification Search .............. 703/2, 703/1, 10; 345/419, 420, 622, 771; 700/182, 700/98; 702/16
See application file for complete search history.

(56) References Cited

U.S. PATENT DOCUMENTS

| | | | |
|---|---|---|---|
| 5,966,133 A | 10/1999 | Hoppe | |
| 6,400,363 B1 * | 6/2002 | Masuda et al. | 345/420 |
| 6,421,051 B1 | 7/2002 | Kato | |
| 6,486,878 B1 * | 11/2002 | Subrahmanyam et al. | 345/420 |
| 6,597,355 B1 * | 7/2003 | Kulkarni | 345/420 |
| 6,603,484 B1 * | 8/2003 | Frisken et al. | 345/622 |
| 6,654,654 B1 * | 11/2003 | Subrahmanyam et al. | 700/98 |

(Continued)

OTHER PUBLICATIONS

Jae Yeol Lee, et al.; *Progressive Solid Models For Internet-Based Design and Collaboration*; DETC2002/CIE-34457; Proceedings of DETC'02; ASME 2002 Design Engineering Technical Conferences and Computers and Information in engineering Conference; Montreal, Canada; Sep. 29-Oct. 2, 2002; pp. 1-10.

(Continued)

*Primary Examiner*—Kandasamy Thangavelu
(74) *Attorney, Agent, or Firm*—Mayer, Brown, Rowe & Maw LLP (57) ABSTRACT

Disclosed is a method for generating progressive solid models based on a cellular topology. A cellular model generating section 10, if a specific feature-based model is inputted, performs a mapping operation on the input feature-based model with reference to an internal feature library, thereby generating cellular topology models based on feature models. A progressive model initializing section 20 composes cells by use of volume attributes of the cells according to a relationship between the input feature-based model and the cells obtained from the cellular topology model to generate an initial cellular model $SM^0$ which is simplified to generate a progressive solid model, and then searches n delta volumes $DV_i$ transiting the initial cellular topology model $SM^0$ by composing and decomposing the cells so as to progressively complement the difference between the initial cellular topology model $SM^0$ and the input feature-based model. A progressive model generating section 30 generates n progressive features $PF_i$ defined as a face subset of the delta volume and corresponding attributes from the n delta volumes $DV_i$, and outputs n progressive cellular models $PF_i$ and the initial cellular model $SM^0$ as the progressive solid model in the form of $\{SM^0, \{PF_0, PF_1, \ldots, PF_{n-1}\}\}$.

4 Claims, 8 Drawing Sheets

U.S. PATENT DOCUMENTS

| | | | |
|---|---|---|---|
| 6,839,632 B2* | 1/2005 | Grace | 702/16 |
| 6,862,023 B1* | 3/2005 | Shaikh | 345/420 |
| 2001/0000963 A1* | 5/2001 | Deguchi | 345/420 |
| 2002/0107673 A1* | 8/2002 | Haller et al. | 703/1 |
| 2002/0113785 A1* | 8/2002 | Hill | 345/420 |
| 2002/0118229 A1* | 8/2002 | Batori et al. | 345/771 |
| 2002/0180729 A1* | 12/2002 | Venkataraman et al. | 345/420 |
| 2002/0183986 A1* | 12/2002 | Stewart et al. | 703/2 |
| 2003/0158621 A1* | 8/2003 | Matsubara et al. | 700/182 |
| 2003/0160779 A1* | 8/2003 | Rabinovich et al. | 345/419 |
| 2004/0220788 A1* | 11/2004 | Assa et al. | 703/10 |

OTHER PUBLICATIONS

Hugues Hoppe; *Progressive Meshes*; http://www.research.microsoft.com/research/graphics/hoppe/ ; © 1996 ACM-0-89791-746-4/96/008; pp. 99-108.

Michael Garland, et al; Suface Simplification Using Quadric Error Metrics; Carnegie Mellon University.

* cited by examiner

PROCESS OF GENERATING FEATURE-BASED MODELS

FIG. 4b $$P=F_0-F_1+F_2-F_3-F_4-F_5-F_6$$

CELLULAR TOPOLOGY MODEL OF FEATURE-BASED MODEL IN FIG. 4a

FIG. 4c

3D MODEL OF CELLULAR TOPOLOGY MODEL

FIG. 5a

| FEATURE CELL OWNERS | FEATURE CELLS |
|---|---|
| $C_1 = \{F_0\}$ | $F_0 = \{C_1, C_2, C_3, C_5, C_7, C_8, C_9\}$ |
| $C_2 = \{F_0, F_1\}$ | $F_1 = \{C_2, C_3\}$ |
| $C_3 = \{F_0, F_1, F_2\}$ | $F_2 = \{C_3, C_4\}$ |
| $C_4 = \{F_2\}$ | $F_3 = \{C_7\}$ |
| $C_5 = \{F_0, F_6\}$ | $F_4 = \{C_8\}$ |
| $C_6 = \{F_6\}$: dummy cell | $F_5 = \{C_9, C_{10}\}$ |
| $C_7 = \{F_0, F_3\}$ | $F_6 = \{C_5, C_6\}$ |
| $C_8 = \{F_0, F_4\}$ | Dummy cells = $\{C_6, C_{10}\}$ |
| $C_9 = \{F_0, F_5\}$ | |
| $C_{10} = \{F_5\}$: dummy cell | |

LIST OF CELL OWNER AND FEATURE-BASED CELL

FIG. 5b $SM^0 = \{C_1, C_2, C_3, C_4, C_5, C_7, C_8, C_9\}$
$DV^0 = C_2$
$DV^1 = C_5$
$DV^2 = C_9$

GENERATED INITIAL CELLULAR MODEL AND DELTA VOLUME

FIG. 5c

3D INITIAL CELLULAR MODEL AND TRANSITED MODEL

| PROGRESSIVE SOLID MODEL OF AUTOMOBILE | $SM^0$ | $SM^2$ | $SM^5$ |
|---|---|---|---|
| solid size(KB) | 118 | 258 | 684 |

METHOD FOR GENERATING PROGRESSIVE SOLID MODELS BASED ON CELLULAR TOPOLOGY

BACKGROUND OF THE INVENTION

1. Field of the Invention

The present invention relates to a method and system for generating a solid model of computer graphics, and more particularly, to a method for generating progressive solid models based on a cellular topology according to a feature approach to achieve effective sharing and transmission of the model under a distributed circumstance.

2. Background of the Related Art

Generally, highly detailed geometric models are necessary to satisfy the growing expectation for realism in computer graphics.

In particular, according to conventional modeling systems, detailed models are created by applying versatile modeling operations, such as extrusion, constructive solid geometry, and freeform deformations, to a variety of geometric primitives. In order to efficiently display detailed models, they must be tessellated into meshes such as triangle meshes.

However, the resulting complex meshes are expensive to store, transmit, and render, thus motivating a number of practical solutions: mesh simplification; level-of-detail (LOD); progressive transmission; and mesh compression.

In computer graphics, models are usually represented by use of triangle meshes. However, solid models are widely used in the industry, and are applied to advanced application such as product design and virtual assembly. In addition, since these developing processes are largely proceeded under distributed circumstances, the problem of sharing and interchanging solid models over the network becomes an important issue.

In particular, in order to solve the above problem, it is necessary to generate adequate level-of-details for the solid model depending on the specific application, and to provide the effective transmitting process. The generation of level-of-details and progressive transmission of the solid model is a prerequisite to properly achieve the collaboration for developing the products under the Internet environment. However, current researches are mostly focused on triangular meshes. There are few researches for generating progressive solid models from solid models at present.

For example, several research efforts have addressed how to generate or compress progressive models from triangular meshes, such as a method of a progressive triangular mesh representation and a mesh simplification for maximally maintaining overall appearance defined by scalar attributes as well as shapes of initial mesh model, a method of quickly simplifying polygonal models by progressively applying vertex contractions using a quadric matrix, and a triangular mesh compression method, called as Edgebreaker, for coding the connectivity of arbitrary triangle meshes, which is widely used due to the efficient compressing rate. There are few researches related to the generation of progressive solid models from the solid model or compression or transmission of the solid model.

SUMMARY OF THE INVENTION

Accordingly, the present invention is directed to a method for generating progressive solid models based on a cellular topology according to a feature approach to achieve effective sharing and transmission of the model under a distributed circumstance that substantially obviates one or more problems due to limitations and disadvantages of the related work.

An objective of the present invention is to provide a method for generating progressive solid models based on a cellular topology, in which an input feature-based model is converted into a feature-based cellular model considering feature information and cellular topology, then an initial progressive solid model is extracted from the converted feature-based cellular model, and finally, a set of progressive features are generated by composing and decomposing cells in the feature-based cellular model to progressively convert the initial progressive solid model into the input feature-based model.

To achieve the objective and other advantages, the present invention provides a method for generating progressive solid models based on a cellular topology, which comprises three steps: a cellular model generating section for performing a mapping operation on the input feature-based model with reference to an internal feature library, thereby generating a feature-based cellular model; a progressive model initializing section for composing cells by use of volume attributes of the cells in the feature-based cellular model according to the relationship between the input feature-based model and the cells obtained from the feature-based cellular model to generate an initial cellular model which is simplified to generate the progressive solid model, and searching n delta volumes transiting the initial cellular topology model by composing and decomposing the cells so as to progressively complement a difference between the initial cellular topology model and the input feature-based model; and a progressive model generating section for generating n progressive features defined as a face subset of the delta volumes and corresponding attributes, and finally, outputting n progressive features $PF_i$ and the initial cellular model $SM^0$ as a completed progressive solid model.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention. In the drawings:

FIG. 4b is a diagram showing the cellular topology of the feature based model of FIG. 4a;

DETAILED DESCRIPTION OF THE PREFERRED EMBODIMENTS

A preferred embodiment according to the present invention will now be explained with respect to the accompanying drawings.

Figure 1:
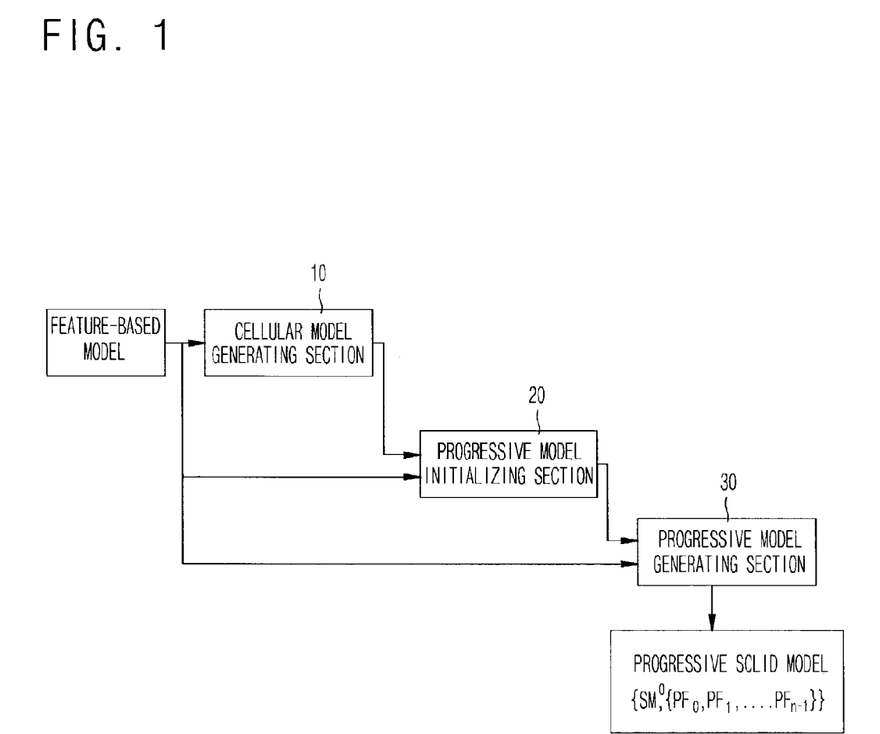
FIG. 1 is a diagram showing a method for generating progressive solid models based on a cellular topology according to the present invention.

Referring to FIG. 1, if a specific feature-based model is inputted to a cellular model generating section 10, the section 10 performs a mapping operation on the input feature-based model considering an internal feature library, thereby generating a feature-based cellular topology model.

A progressive model initializing section 20 composes cells by use of volume attributes of the cells according to the relationship between the input feature-based model and the cells obtained from the cellular topology model to generate an initial cellular model $SM^0$ which is simplified to generate a progressive solid model, and further searches n delta volumes $DV_i$ transiting the initial cellular topology model $SM^0$ by composing and decomposing the cells so as to progressively complement the difference between the initial cellular topology model $SM^0$ and the input feature-based model.

A progressive model generating section 30 generates n progressive features $PF_i$ defined as a face subset of the delta volume and related attributes $A_i$ from the n delta volumes $DV_i$, and outputs the progressive solid model PSM in the form of $\{SM^0, \{PF_0, PF_1, \ldots, PF_{n-1}\}\}$.

The respective progressive feature $PF_i$ is defined by $(N_i, O_i, A_i)$, where $A_i$ represents attributes such as color, texture, engineering information and so forth.

$N_i$ is a subset of faces of $DV_i$ to be added to the model $SM^i$ to be transited to $SM^{i+1}$ and is defined as following Equation 1.

$$N_i = \partial DV_i - \sum_k f_k, \text{ where } f_k \in \partial DV_i \text{ and } f_k \cap \partial SM^i \neq \varnothing \quad \text{Equation 1}$$

where $\partial SM^i$ represents a set of exterior faces of the model $SM^i$, and $f_k$ represents a face of $DV_i$.

$O_i$ is a subset of faces of $DV_i$ to be eliminated from the models $SM^i$ to be transited to $SM^{i+1}$ and is defined as following Equation 2.

$$O_i = \text{A set of } faceIds \text{ of } \sum_k f_k, \quad \text{Equation 2}$$

where $f_k \in \partial DV_i$ and $f_k \cap \partial SM^i \neq \varnothing$ where $\partial DSM^i$ represents exterior faces of the model $SM^i$, and $f_k$ means a face of the delta volumes $DV_i$.

The method of generating the progressive solid models based on the cellular topology according to the present invention will now be described.

Figure 2:
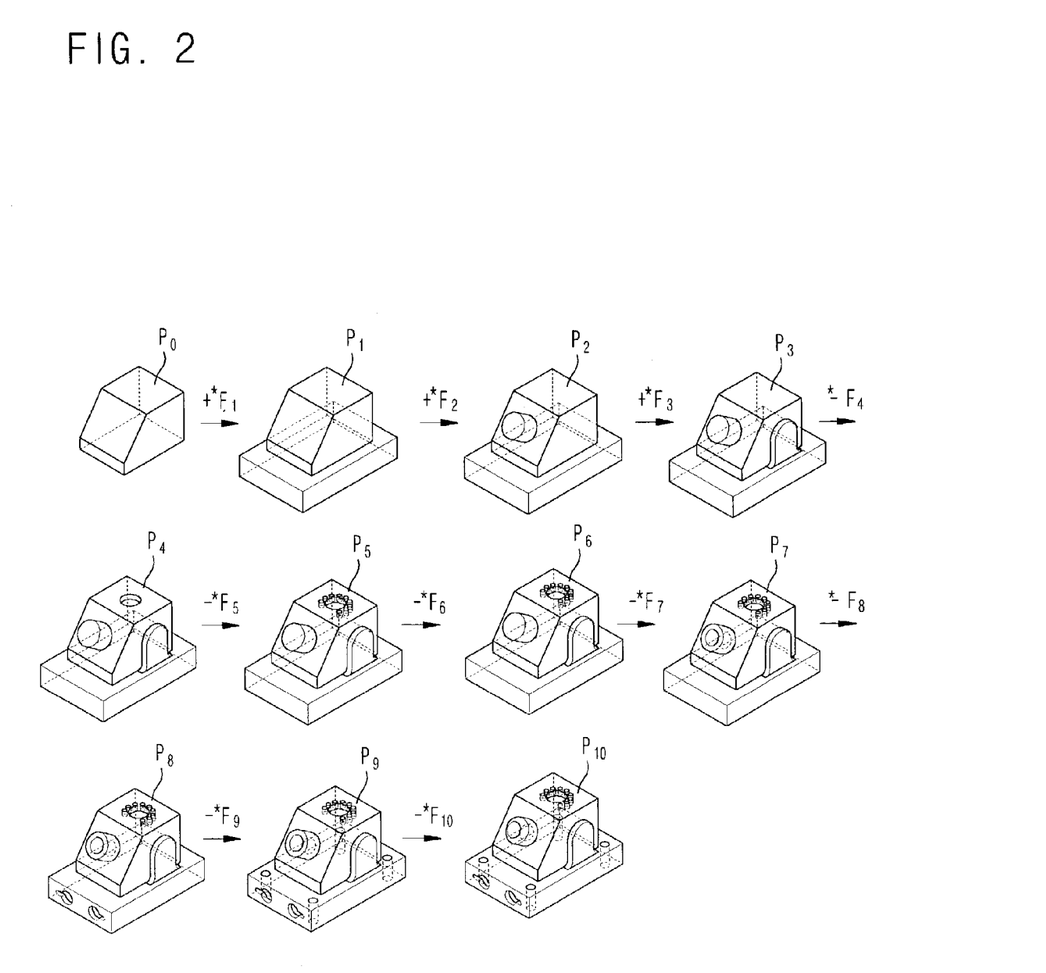
FIG. 2 is a diagram showing a process of generating feature-based models.
Figure 3:
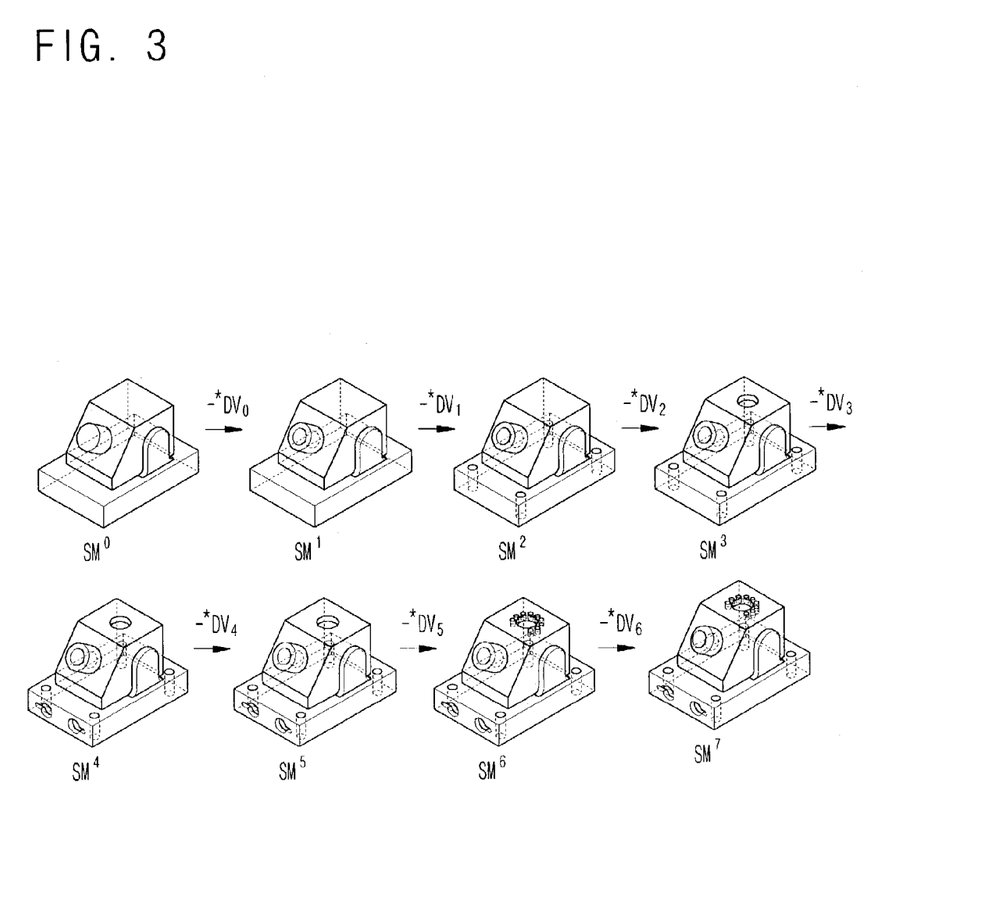
FIG. 3 is a diagram showing a process of transiting an initial cellular model generated corresponding to the feature-based models of FIG. 2 to progressive solid models.

FIGS. 2 and 3 schematically show the input and result of the procedure provided by the present invention. FIG. 2 shows a process of generating the feature-based model to be used in the input, in which $P_{10}$ is corresponding to the input of the procedure provided by the present invention. FIG. 3 shows the result of the progressive solid model generated from the input $P_{10}$ according to the procedure provided by the present invention. In other words, the figures show the result of progressive solid model generated by transiting an initial model $SM^0$ to seven delta volumes $DV_0$ to $DV_6$.

Figure 4A:
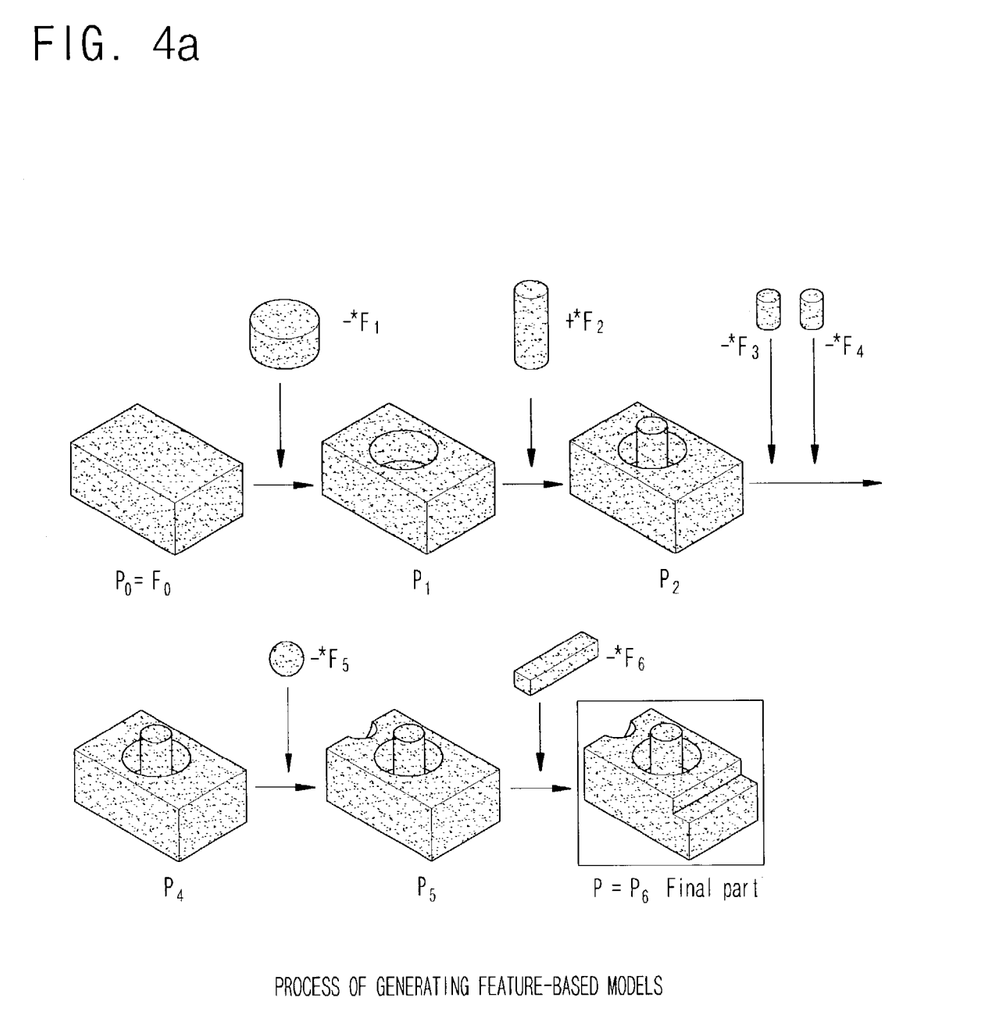
FIG. 4a is a diagram showing a process of generating feature-based cellular topology models.
Figure 4B:
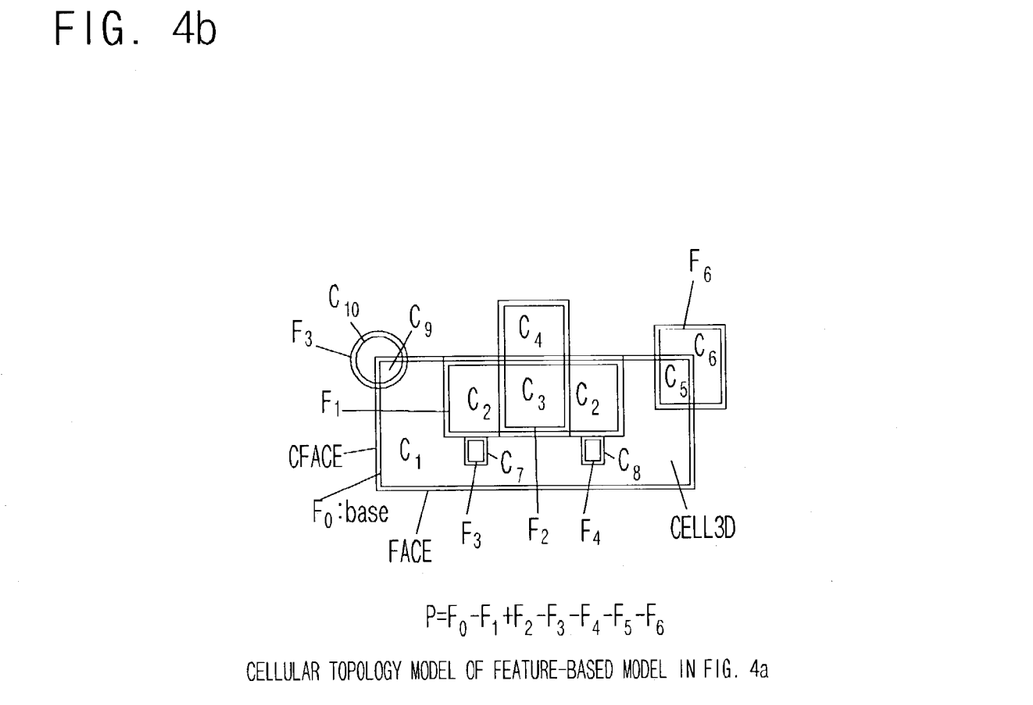

First of all, as will be seen from FIG. 4a, if a specific feature-based model $P_6$ for generating the progressive solid model PSM according to the present invention is given to the cellular model generating section 10, the cellular model generating section 10 performs a mapping operation on the input specific feature-based model $P_6$ with reference to the internal feature library, thereby generating the feature-based models P based on the cellular topology as shown in FIG. 4b.

The input specific feature-based model $P_6$ is generated by adding or subtracting features $F_1$ to $F_6$ to or from the specific base feature-based model $P_0$, as shown in FIG. 4a. The transited feature-based models $P_1$ to $P_6$ are generated by performing Boolean union operation (+*) or Boolean difference operation (−*) on the other feature-based models $F_1$ to $F_6$ relative to the previous feature-based models $P_1$ to $P_6$.

For example, in FIG. 4a, the transited feature-based model $P_2$ is generated by performing the Boolean union operation (+*) on the feature-based model $P_1$ just before the transition to further add the feature-based model $F_2$ indicating a protruded cylinder, the transited feature-based model $P_5$ is generated by performing the Boolean difference operation (−*) on the feature-based model $P_4$ just before the transition to eliminate the feature-based model $F_5$ indicating a sphere, and the input transited feature-based model $P_6$ is generated by performing the Boolean difference operation (−*) on the feature-based model $P_5$ just before the transition to eliminate the feature-based model $F_6$ indicating a polyhedron.

In addition, the feature-based model P based on the cellular topology is modeled as $P=F_0-*F_1+*F_2-*F_3-*F_4-*F_5-*F_6$ as shown in FIG. 4b. At that time, $F_0$ denotes a base feature-based model, $F_1$ to $F_6$ denote other features further added or subtracted to or from the base feature-based model $F_0$, and $C_1$ to $C_{10}$ denote feature cells generated based on criteria such as volume, complexity and so forth.

Figure 4C:
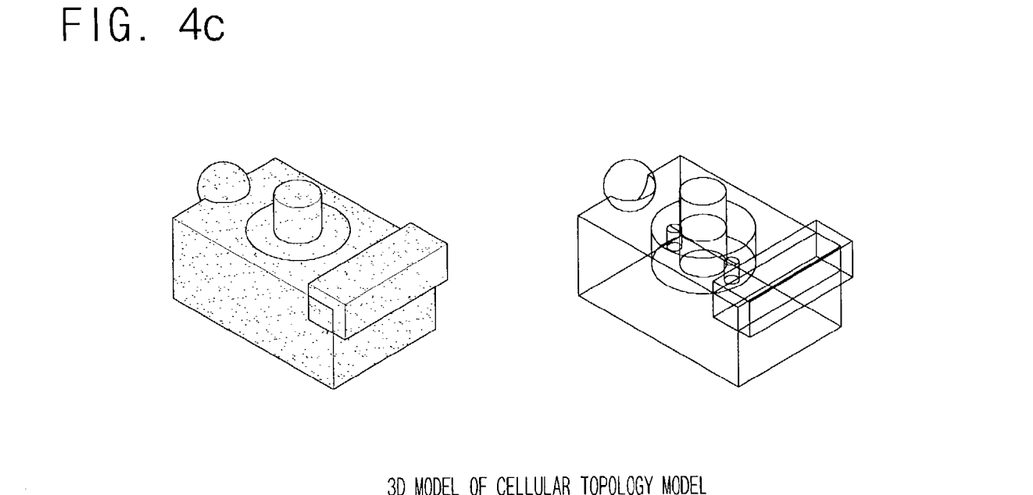
FIG. 4c is a diagram showing a 3d model of the cellular topology model of FIG. 4b.

After the feature-based cellular topology model P is generated by the cellular model generating section 10, the progressive model initializing section 20 generates an initial progressive solid model $SM^0$ by composing all the generated cells except dummy cells which represents an overall shape of the feature-based model P. And then, the section 20 searches n delta volumes $DV_i$ transiting the initial cellular Model $SM^0$ by composing and decomposing the cells $C_1$ to $C_{10}$ generated from the difference of the 3D model shown in FIG. 4c.

As will be seen from FIG. 4a, the cellular model used in the cellular model generating section 10 is represented by refining a LUMP of the solid model into a region of CELL3D. The CELL3D is represented by a set of CFACE. The CFACE indicates one side, and the FACE is represented by the CFACE and its partner. In addition, the feature information is stored by assigning attributes to the CELL3D and CFACE.

Figure 5A:
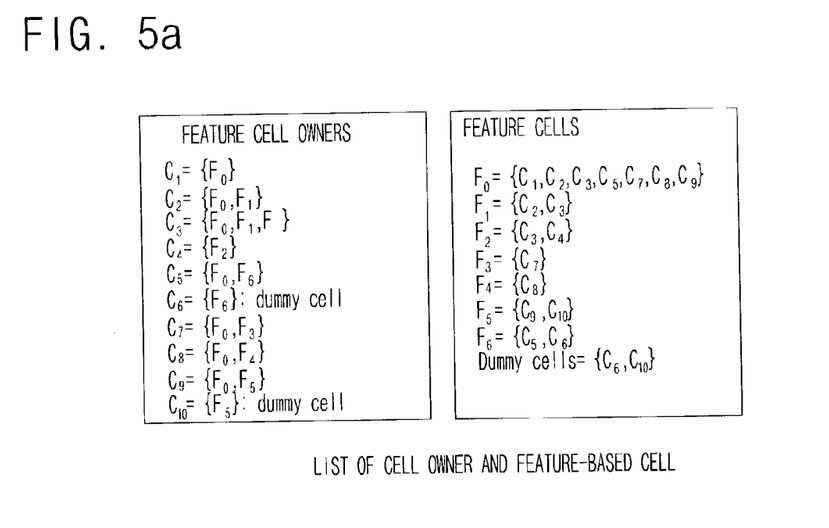
FIG. 5a is a chart showing the relationship between cells and the feature-based models of FIGS. 4a–4c.
Figure 5B:
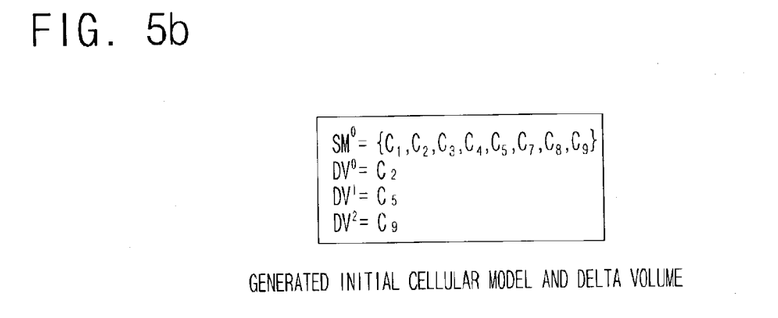
FIG. 5b is a chart showing a cellular model defined as a composition of cells.
Figure 5C:
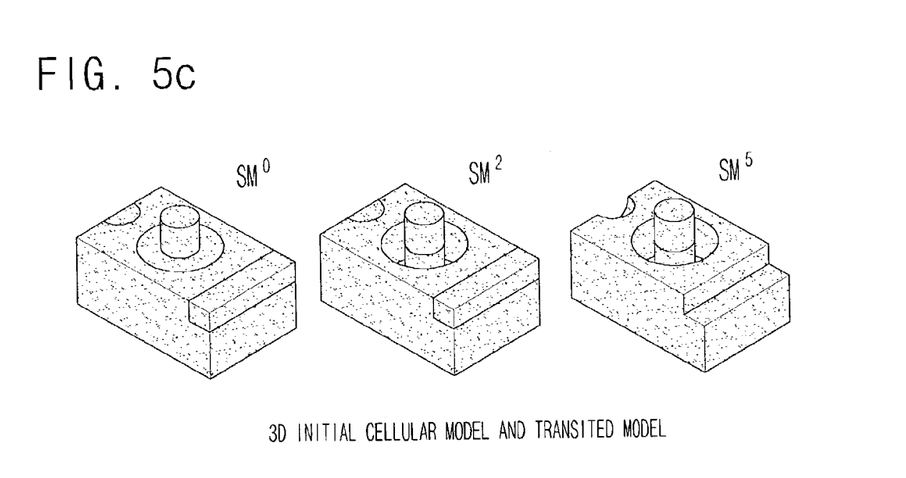
FIG. 5c is a diagram showing an initial cellular model and transited feature-based models.

FIG. 5a shows a relationship between the cells $C_1$ to $C_{10}$ and the feature-based models $F_1$ to $F_7$ in the cellular topology model P shown in FIG. 4, FIG. 5b shows a portion of delta volumes $DV_0$, $DV_1$, and $DV_2$, and FIG. 5c shows the generated 3D initial cellular model $SM^0$ and the transited model $SM^2$.

For example, in FIG. 5a, owner features of $C_2$ are features $F_0$ and $F_1$, and the cells constructing the feature-based model $F_2$ are $C_3$ and $C_4$. FIG. 5b shows the initial cellular model $SM^0$ defined as the composition of the remaining cells ($C_1$, $C_2$, $C_3$, $C_4$, $C_5$, $C_7$, $C_8$ and $C_9$) except for dummy cell defined in FIG. 5a, the delta volume $DV_0$ defined as $C_2$, the delta volume $DV_1$ defined as $C_5$, and the delta volume $DV_2$ defined as $C_9$. In particular, FIG. 5c shows the initial cellular model $SM^0$ and the transited feature-based model $SM^2$ in which a circular hole and a hexahedron are eliminated by performing Boolean difference operation (−*) on the delta volumes $DV_0$ and $DV_1$ defined as $C_2$ and $C_5$ relative to the initial cellular model $SM^0$.

After the initial cellular model $SM^0$ and n delta volumes $DV_i$ transiting the initial cellular model $SM^0$ are searched, the progressive model generating section 30 generates n progressive features $PF_i$ from n delta volumes $DV_i$, in which $PF_i$ is defined as a face subset of the delta volume according to an attribute $A_i$ of n delta volumes $DV_i$ and Equations 1 and 2, and outputs n progressive cellular models $PF_i$ and the initial cellular model $SM^0$ as the progressive solid model PSM in the form of $\{SM^0, \{PF_0, PF_1, \ldots, PF_{n-1}\}\}$.

Figure 6:
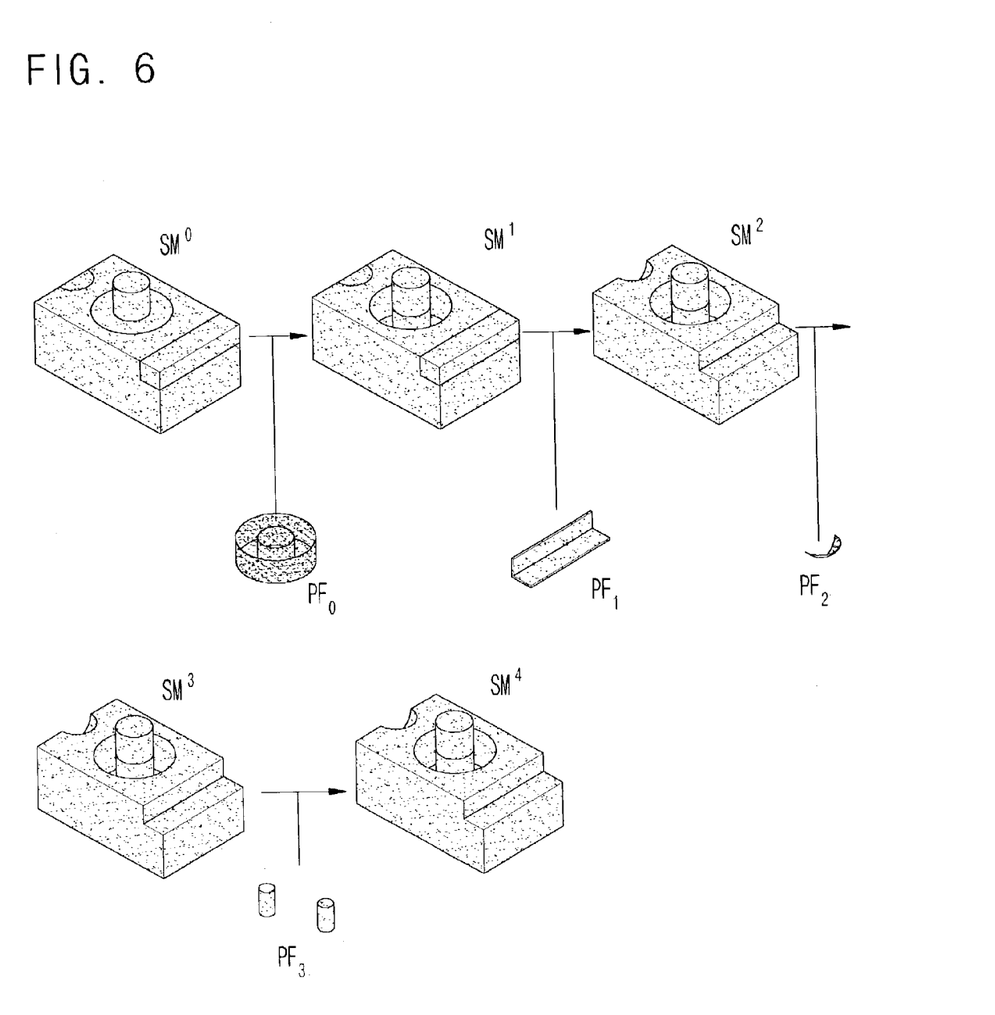
FIG. 6 is a diagram showing a process of generating progressive solid models based on the progressive features.
Figure 7A:
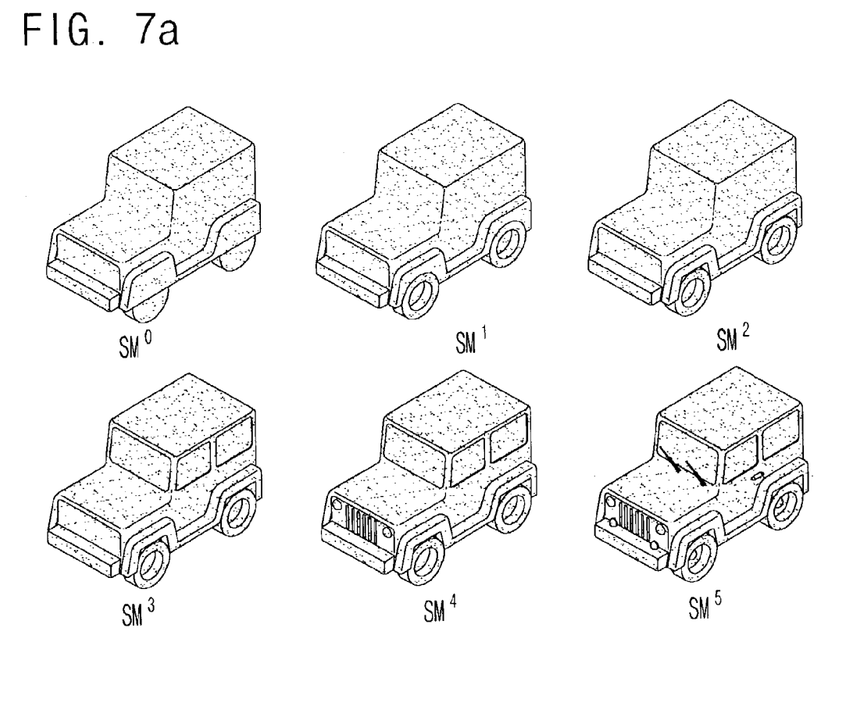
FIGS. 7a and 7b show one embodiment of generating progressive solid models from the appearance of an automobile, in the respective steps size of the progressive solid models being compared to each other.
Figure 7B:
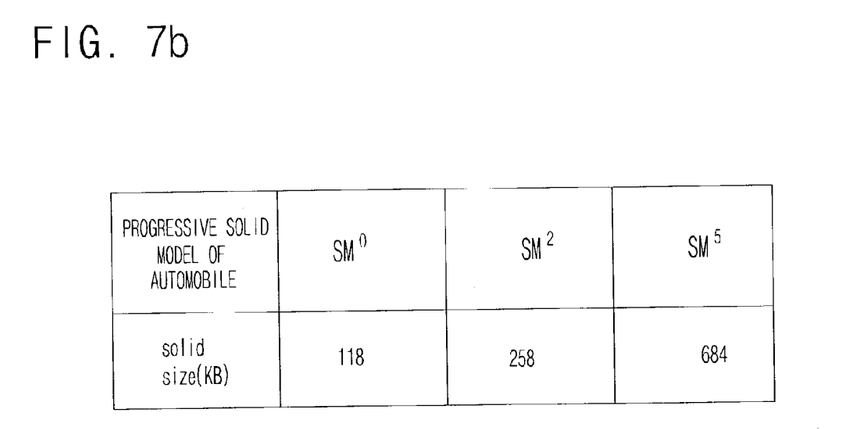

FIG. 6 shows a process of finally completing and outputting the progressive solid model PSM by generating the initial cellular model $SM^0$ and four progressive features $PF_0$, $PF_1$, $PF_2$ and $PF_3$ from four delta volumes $DV_0$, $DV_1$, $DV_2$ and $DV_3$ searched to transit the initial cellular model $SM^0$. FIG. 7a shows the progressive solid models generated when the method of generating the progressive solid model is applied to an automobile model, and FIG. 7b shows comparative file sizes of the models corresponding to three steps.

Meanwhile, in the method of generating the progressive solid models based on the cellular topology according to the present invention, the reason to use the progressive features $PF_i$ instead of the delta volumes $DV_i$ is as the following: the more the transition level interacting between the feature-based models is increased by the use of the delta volumes $DV_i$, the more file size is increased. In the transition process, the Boolean union operation (+*) or Boolean difference operation (−*) requires expensive computational cost. Meanwhile, if the progressive features $PF_i$ are utilized, it requires the simple process of composing and eliminating the faces of the models, thereby simplifying the calculation and speeding up the transition process.

In actual, if the solid model is transmitted over the Internet, the transmission of the perfect detailed model requires a lot of time. Therefore, a simplified solid model $SM^0$ is firstly transmitted, and then progressive features $PF_i$ are progressively transmitted, so that it is possible to transmit it quickly and effectively. If necessary, it is possible to obtain the level suitable for the application or to allow the user to see only a specific level according to the accessibility of the user.

With the above description of the method for generating the progressive solid models based on the cellular topology according to the present invention, the input feature-based model is represented as an initial progressive solid model $SM^0$ and subsequent progressive features $PF_i$, and thus the progressive solid model representation can be described in the form of $\{SM^0, \{PF_0, PF_2, \ldots, PF_{n-1}\}\}$.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for generating progressive solid models based on a cellular topology, the method comprising the following steps:

a cellular model generating section, if a specific feature-based model is inputted, for performing a mapping operation on the input feature-based model with reference to an internal feature library, thereby generating cellular topology models based on feature models;

a progressive model initializing section for composing cells by use of volume attributes of the cells according to a relationship between the input feature-based model and the cells obtained from the cellular topology model to generate an initial cellular model which is simplified to generate the progressive solid model, and searching n delta volumes transiting the initial cellular topology model by composing and decomposing the cells so as to progressively complement a difference between the initial cellular topology model and the input feature-based model; and a progressive model generating section for generating n progressive features defined as a face subset of the n delta volumes and corresponding attributes, and outputting n progressive features $PF_1$, and the initial cellular model $SM^0$ as a completed progressive solid model representation PSM=$\{SM^0, \{PF_0, PF_1, \ldots, PF_n\}\}$.

2. The method as claimed in claim 1, wherein n progressive features generated in the progressive model generating section are represented as a subset of faces of n delta volumes generated in the progressive model initializing section and related attributes.

3. The method as claimed in claim 2, wherein the subset ($N_i$) of faces of delta volumes, which is contained in n progressive features generated in the progressive model generating section, are those to be added to $SM^i$ to be progressively transited to $SM^{i+1}$, and is defined in the following equation.

$$N_i = \partial DV_i - \sum_k f_k, \text{ where } f_k \in \partial DV_i \text{ and } f_k \cap \partial SM^i \neq \varnothing$$

where $\partial SM^i$ means a set of exterior faces of the feature cells, and $f_k$ means a face of $DV_i$.

4. The method as claimed in claim 2, wherein the subset ($O^i$) of faces of delta volumes, which is contained in n progressive features generated in the progressive model generating section, are those to be removed from $SM^i$ to be progressively transited to $SM^{i+1}$, and is defined in the following equation:

$$O_i = \text{A set of } \textit{faceIds} \text{ of } \sum_k f_k, \text{ where } f_k \in \partial DV_i \text{ and } f_k \cap \partial SM^i \neq \varnothing$$

where $\partial SM^i$ means exterior faces of the transited model $SM^i$, and $f_k$ means a face of delta volumes $DV_i$.

* * * * *